United States Patent
Shaw et al.

(10) Patent No.: US 11,827,029 B2
(45) Date of Patent: Nov. 28, 2023

(54) SELECTING BETWEEN BLACK PRINT AND PROCESS BLACK PRINT

(71) Applicant: HEWLETT-PACKARD DEVELOPMENT COMPANY, L.P., Spring, TX (US)

(72) Inventors: Mark Q. Shaw, Boise, ID (US); Scott K. Hymas, Boise, ID (US); Jeffrey H. Luke, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 336 days.

(21) Appl. No.: 17/321,306

(22) Filed: May 14, 2021

(65) Prior Publication Data
US 2022/0363069 A1 Nov. 17, 2022

(51) Int. Cl.
*B41J 2/175* (2006.01)
*G06N 20/00* (2019.01)
*G06F 3/12* (2006.01)

(52) U.S. Cl.
CPC ....... *B41J 2/17566* (2013.01); *B41J 2/17506* (2013.01); *G06F 3/1219* (2013.01); *G06F 3/1239* (2013.01); *G06N 20/00* (2019.01); *B41J 2002/17569* (2013.01); *B41J 2002/17589* (2013.01)

(58) Field of Classification Search
CPC ................ B41J 2/17566; B41J 2/17506; B41J 2002/17569; B41J 2002/17589; G06F 3/1219; G06F 3/1239; G06N 20/00; G06N 20/00
See application file for complete search history.

(56) References Cited

U.S. PATENT DOCUMENTS

| 11,023,185 B2* | 6/2021 | Shramm .................. G06F 3/121 |
| 2006/0158673 A1* | 7/2006 | Gondek ............... G06K 15/102 358/1.13 |
| 2021/0368063 A1* | 11/2021 | Wong .................... G06F 3/1204 |

FOREIGN PATENT DOCUMENTS

WO   WO-2013062508 A1 *   5/2013   .......... B41J 2/17503

* cited by examiner

*Primary Examiner* — Sharon Polk
(74) *Attorney, Agent, or Firm* — Brooks, Cameron & Huebsch, PLLC

(57) ABSTRACT

An example method comprises identifying a plurality of supply levels corresponding to a set of print supplies of a print device. The example method further comprises coordinating depletion of the set of print supplies by selecting between black print and process black print for a print job of the print device based on the plurality of supply levels.

15 Claims, 5 Drawing Sheets

SELECTING BETWEEN BLACK PRINT AND PROCESS BLACK PRINT

BACKGROUND

Various types of devices include replaceable print supplies, such as inkjet printhead assemblies, and print material containers for two-dimensional (2D) or three-dimensional (3D) print devices. Example print material containers include inkjet cartridges, toner cartridges, ink and toner supplies, and build material supplies, among others. In some instances, print devices may have a set of print supplies used to print in black and in color.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Documents may be used to disseminate information and may include printed forms. A printed document may be produced by a print device based on data received from a computing device. Various types of print devices use a set of replaceable print supplies to produce printed documents, such as 2D and 3D print devices. The print device may form markings using marking material, such as using liquid print fluids or powdered toner, on the print media based on the data received. Example 2D and 3D print devices include inkjet printers, dry toner printers, liquid toner printers, and 3D powder bed inkjet printers. Example print supplies include print material containers, such as ink tanks, ink bottles, inkjet printhead cartridges, dry toner reservoirs, liquid toner reservoirs, dry toner cartridges, and build material supplies. Many print devices include a set of print supplies comprising black print supply and non-black print supply, and which may be depleted or consumed while printing in black and in color.

As the black print supply is depleted, the print quality of the black print may degrade. To improve print quality, a process black print may be used which supplements the black print supply with non-black print supply. The process black print may be more expensive per page than the black print. Additionally, the set of print supplies may deplete at different rates, resulting in multiple replacement processes, which may increase costs to replace the set of print supplies.

Examples of the present disclosure are directed to selecting between black print and process black print for a print device based on supply levels of a set of print supplies installed with the print device. The black print or process black print may be selected to coordinate depletion of the set of print supplies. By coordinating depletion of the set of print supplies, multiple print supplies of the set may be replaced in a replacement order and/or at the same time, which may reduce shipping costs and/or service costs while minimizing degrading of the print performance and improving user satisfaction.

Figure 1:
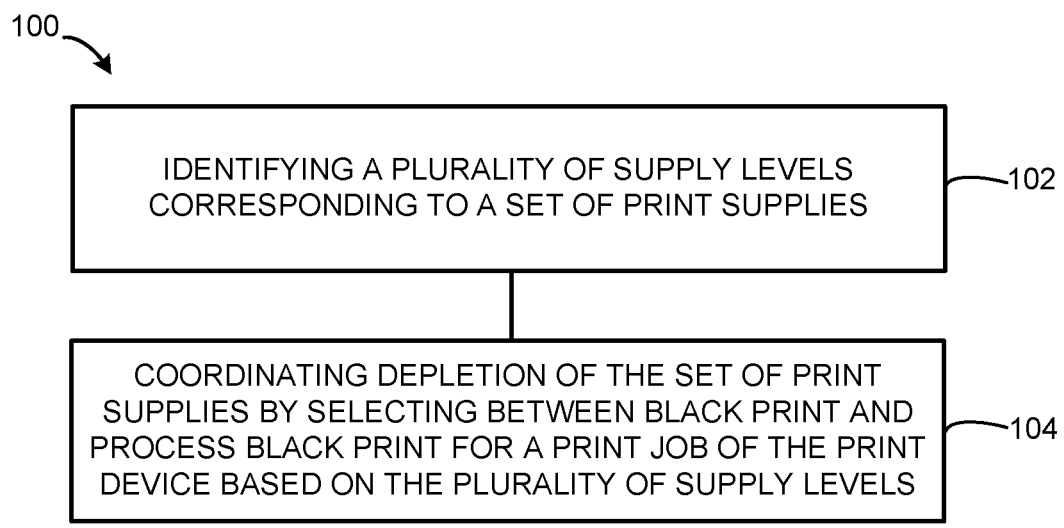
FIG. 1 illustrates an example method for selecting between black print and process black print, in accordance with examples of the present disclosure.

Turning now to the figures, FIG. 1 illustrates an example method for selecting between black print and process black print, in accordance with examples of the present disclosure.

At 102, the method 100 includes identifying a plurality of supply levels corresponding to a set of print supplies of a print device. As previously described, the print supplies may include ink or toner which are in print material containers. In some examples, the set of print supplies include a black print supply and a plurality of non-black print supplies. The plurality of non-black print supplies may be separate from one another, such that each of the non-black print supplies are in a separate print material container. However, examples are not so limited and the plurality of non-black print supplies may be in a single print material container, such as a 3-in-1 color ink or toner cartridge. In some examples, the set of print supplies includes cyan (C), magenta (M), yellow (Y), and black (K) print supplies, which is sometimes herein referred to as CMYK.

Each print supply in the set may have an associated supply level, which indicates an amount of print supply that is depleted and/or that remains. As used herein, a supply level refers to or includes an estimated or measured remaining amount of marking material (e.g., ink or toner) of a print supply. The print device executes print jobs by printing out documents using the set of print supplies. The supply levels may be identified by the print device based on a page count that estimates an average number of pages per print supply and/or using sensors to detect the supply levels.

The set of print supplies may be used by the print device to execute different types of print jobs. For example, the print device may print in black and in color. Black content may be executed using a black colorant, sometimes referred to as a "black print" or a "K-black print", or using black colorant and non-black colorant, sometimes referred to as a "process black print". As used herein, a black print includes or refers to printing black content using black print supply without non-black print supply.

As used herein, a process black print includes or refers to printing black content using the black print supply and a non-black print supply. In some examples, one non-black print supply is used, two non-black print supplies are used, or the plurality of non-black print supplies are used in a process black print. The non-black print supply may be used as an overlapping colorant, e.g., under or over colorant, with the black print supply, such as by overlaying one colorant under another. In some examples, the non-black print supply is used as an under colorant for the black print supply, and in other examples, the non-black print supply is used as an over colorant for the black print supply. An overlapping colorant may be refer to or include a colorant that covers a common space of the print media as a black colorant. The overlapping colorant may intersect the black colorant in a height, width, and/or depth direction of the print media (e.g., the common space). When the black print supply is depleted below a threshold level, a black process print may be used to improve the print quality of printed black content until the black print supply may be replaced.

At 104, the method 100 includes coordinating depletion of the set of print supplies by selecting between the black print and process black print for a print job of the print device based on the plurality of supply levels. As used herein, a print job includes or refers to a file or set of files to be submitted to a print device, such as a data object that represents a document to be printed. A user may request a print job using a computing device, and the print job is communicated to the print device directly by the computing device or through another local or remote computing device, such as a local or remote server. The user may include an individual customer or a user associated with an organization which is the customer. In some examples, the method 100 may further include initiating execution of and/or executing the print job by the print device based on the selection.

In some examples, the set of print supplies may have variances in supply lifetimes, such as different print supplies of the set having different supply lifetimes. As used herein, supply lifetime of a print supply includes or refers to an estimated amount of time and/or pages remaining until depletion of the print supply. Coordinating depletion of the set of print supplies may include reducing the variances in the supply lifetimes of the set of print supplies, and in some examples, may eliminate or prevent variances in the supply lifetimes of the set of print supplies such that a plurality of print supplies of the set of print supplies are depleted at the same time or within a threshold amount of time.

Selecting between the black print and process black print may include balancing print performance and supply lifetime of the set of print supplies. Print performance may include a quality of the print and cost of the print (e.g., cost per page). As described above, as the black print supply is depleted, the black print may decrease in print quality. In some examples, the non-black print supplies may be more expensive than the non-black print supply, and the process black print may have a higher cost per page than the black print. In some examples, the difference in price may be passed to the customer and/or may not be (e.g., is absorbed by the service provider).

In some examples, the method 100 includes applying a set of rules to the plurality of supply levels to automatically select between the black print and process black print. Example rules include a threshold level of the black print supply associated with selecting the black print or the process black print, supply levels of the set of print supplies associated with selecting the black print or the process black print, and print quality associated with selecting the black print or the process black print, among other rules. As an example, the process black print may be selected in response to the black print supply being below a threshold supply level or a black print being below a threshold optical density. As another example, the black print may be selected in response to the supply level of the black print supply being above a threshold supply level and/or a supply level (or supply levels) of a non-black print supply being below the threshold supply level.

In some examples, the method 100 includes applying a data model to input data to automatically select between the black print and process black print. The input data may include the plurality of supply levels corresponding to the set of print supplies, patterns of usage of the set of print supplies, shipping parameters, predicted supply lifetime for the set of print supplies, print performance, service parameters, customer labor parameters, content of the print job, a service agreement, and a combination thereof and among other inputs. In some examples, the data model may include multiple cost inputs, such as the cost per page and the shipping costs, and the output may select between black print and process black print to provide a net savings in costs or neutral cost difference, as further described below.

The patterns of usage may include current consumption rates of print supplies in the set of print supplies and/or trends of consumption rates of print supplies for the print device over time. A consumption rate refers or includes to the rate the print supply is used or consumed. Example shipping parameters include shipping costs, labor costs for executing the shipment, and an amount of time for the replacement print supply to be received by the customer after the replacement order is initiated. The predicted supply lifetime may be based on consumption rates, past usage patterns for the print device and/or general trends. Example print parameters include print quality and cost to the customer and/or service provider, such as cost per page to the customer or service provider. Example service parameters include labor cost for the service provider to implement the service, and/or an amount of time for the replacement service to be provided after the replacement order is initiated for a managed print service. Example customer labor parameters include estimated labor cost for the customer to install the replacement print supplies. The content of the print job may include a categorization, such as a rating of importance of the document or other identification of the image or print job type.

In some examples, users of print devices may print documents within a contractual print system. For example, the print system may include print devices and/or print supplies which are provided to the customer by a service provider, and the service provider may maintain the print devices, such as replacing parts and/or reordering the print supplies. The system may be based on service plans that identify a number of pages printed per billing cycle and/or a pre-paid amount of pages. The service provider may manage billing for providing the service, order replacement print supplies and/or perform maintenance on the print device. In other examples, the service provider may provide a management print service, as further described below.

The service agreement may have associated terms, such as print costs, guaranteed print qualities, time for replacement print supplies to be received, and penalties to the service provided for failure to meet a term. As an example, a customer may contract with a print service provider to provide a minimum number of print pages per month at a quality of print above a threshold. The customer may receive a discount if the print quality drops below the threshold or if the minimum print pages is not met. The service agreement may define a cost per page that differs depending on the print job type (e.g., in black, in color, print quality), or may define a cost per page regardless of the print job type. The print service provider may track the consumption of the set of print supplies and is responsible for providing replacement print supplies. As another example, a customer may contract with a managed print service provider that is responsible for managing the health of the print device, including replacing print supplies. The managed print service provider may send an employee to the location of the print device to replace the print supplies. A managed print service, as used herein, includes or refers to locally managing the print device, such as a local visit by an employee of the service provider to a location of the print device to manage the health of the print device (e.g., replacing parts, replacing print supplies, and/or otherwise physically working on the print device). A print service includes or refers to remotely managing the print device, which is sometimes herein referred to as a "remote print service".

In some examples, the print system may be cloud-based, which may be referred to as a "cloud-based print system", and may provide a plurality of services, such a subscription services. A subscription service includes a service provided on a contractual basis for a period of time and for an agreed to amount. Example subscription services include a print supply replacement service and/or a service for a predefined number of printed pages.

A print supply replacement service may include tracking supply levels and providing automatic replacement of the set of print supplies of the print device, which may be ordered and replaced or refilled by the service provider. In various examples, the print supply replacement service is a subscription service or pre-paid service which is calculated based on a number of pages. In some examples, when the print device identifies a print supply has reached a threshold level, the print device may communicate with the service provider, either directly or through a local computing device, and the service provider may automatically initiate a replacement order of the print supply or schedule an employee to visit. With a print supply replacement service, the customer may pay the subscription fee and the service provider is responsible for providing print supplies as necessary.

In some examples, the data model applied to input data to select between the black print and process black print may include an artificial intelligence (AI) model or machine learning model (MLM). Various ML frameworks are available from multiple providers which provide open-source ML datasets and tools to enable developers to design, train, validate, and deploy MLMs, such as AI/ML processors. AI/ML processors (also sometimes referred to as hardware accelerators (MLAs), or Neural Processing Units (NPUs)) may accelerate processing of MLMs. AI/ML processors may be integrated circuits (ASICs) that have multi-core designs and employ precision processing with optimized dataflow architectures and memory use to accelerate and increase computational throughput when processing MLMs.

MLMs may be stored as model files having a representational data format which describes the architecture of the model (e.g., input, output, and hidden layers, layer weights, nodes of each layer, interconnections between nodes of different layers, and ML operations of each node/layer) along with operating parameters and, thus, describe or represent a process flow between input and output layers of an MLM. After development, the MLM may be deployed in environments other than the environment or framework in which the model was initially trained. For example, distributing computing devices of a cloud system may train the MLM and distribute the trained MLM to local computing devices and/or printer devices to implement.

In some examples, the data model applied to the input data is used to balance the print performance with cost and supply lifetime of the set of print supplies. For example, the method 100 may include predicting depletion of the set of print supplies based on the input data and selecting the black print or process black print based on the prediction and using the data model. By predicting depletion of the set of print supplies, a service provider may initiate a replacement order for the set of print supply in advance, thereby reducing costs caused by a rushed service, such as rushed shipping costs, labor costs (e.g., costs due to overtime and/or holidays), and/or violating or triggering contractual agreed to terms that results in a penalty to the service provider.

In various examples, the set of rules and/or the data model may be used to balance costs for the service provider with costs and print quality to the customer. For example, black print and process black print may be adaptively switched between to extend the supply lifetime of the set of print supplies and coordinate depletion of the set of print supplies, while minimizing loss of print quality and cost to the customer and/or service provider. In some examples, the amount of time the print device is operable is increased, and shipping costs and customer interaction servicing the print device is decreased as compared to separate shipments for the print supplies of the set, which may reduce labor costs to the customer to install replacement print supplies. In some examples, the cost may be balanced to minimize costs to the customer and/or to the service provider. For example, the process black print may increase the cost per page as compared to a black print, and the increased cost per page may be offset by shipping and/or labor cost savings from combining multiple print supplies in a replacement order. In other examples, a black print may be selected as the increased cost per page for a process black print (as compared to the black print) may be greater than the shipping and/or labor cost savings from combining the multiple print supplies in the replacement order.

In some examples, balancing cost with print quality may be used to optimize the print performance, costs, and supply lifetime. For example, the print performance, costs, and supply lifetime may be optimized by weighting or prioritizing the input data, such as each input having a different numerical weight, and minimizing a cost function associated with the weighted input data. Input data that has a greater impact on the print performance, costs, and/or supply lifetime, for example, may have a greater weight than data that has a lower impact. However, examples are not so limited and may include other prioritization schemes or may not include weighting or prioritization.

In various examples, the data model may be updated over time. For example, the data model may be updated based on feedback provided. Example feedback includes updated input data and/or updates to the structure of the data model itself. As an example, the data model may be updated based on a feedback pattern of usage of the set of print supplies for the print device and/or a user, and/or patterns of usage of sets of print supplies of other print devices. For example, a print device or set of print devices may exhibit a particular pattern of usage of the set of print supplies, such as a higher consumption rate of Y print supply as compared to CM print supplies. In other examples, a general pattern may be observed as being common to many print devices, such as a higher consumption rate of C print supply as compared to YM print supplies. In some examples, particular organizations, industries, and/or geographies may exhibit specific patterns of usage. Other feedback may include changes to the service agreement, information to categorize print jobs, changes in shipping and/or service parameters, and changes in types of print supply, among others.

In some examples, the method 100 includes initiating a replacement order corresponding to a plurality of print supplies of the set of print supplies. Accordingly, multiple print supplies of the set may be ordered at the same time. The replacement order may include two print supplies, three print supplies, or all of the set of print supplies, such as a subset or all of the CMYK print supplies. In some examples, coordinating depletion of the set of print supplies includes adaptively switching between the black print and the process black print for a plurality of print jobs including the print job. As described above, the set of print supplies may include black print supply and a plurality of non-black print supplies, and the method 100 may further include initiating a simultaneous replacement of the black print supply and a non-black print supply of the plurality of non-black print supplies via the replacement order. By coordinating depletion and replacement of print supplies, a service provider may reduce shipping and/or other service cost by the simultaneous replacement. And, there may be fewer disruptions to use of the print device due to the simultaneous replacement and/or increased supply lifetime.

In some examples, the selection may be based on a categorization of the print job. As described above, the print job may have a numerical value representing the importance of the document and/or a minimum quality print. The image type or job type may be categorized using manual tagging or ML, such as object detection and categorization, with the black print or process black print being applied based on the image or job type. The object(s) in the print job may be detected using a dataset and a MLM, such as identifying a location of object(s) and classifying an image or the object (s) using a Common Objects in Context (COCO) dataset and a Fast Region-Convolution Neural Network (R-CNN) and/ or Mask R-CNN. Other examples may include use of COCO, Scene Understanding (SUN), ImageNet Large Scale Visual Recognition Competition (ILSVRC), Pattern Analysis Statistical Modelling and Computational Learning (PASCAL) Visual Object Classes (VOC) datasets and/or combinations thereof. Example MLMs include Faster R-CNN, You Only Look Once (YOLO), Single Shot Detector (SSD), Mask R-CNN, DeepLab, and/or Pyramid Scene Parsing Network (PSPNet). However, examples are not limited to categorizing the print job using object detection, and may include other categorizations.

In various examples, the method 100 may be implemented by the print device. A print device, as used herein, includes or refers to a device that makes a representation of text or graphics on physical media. In some examples, the method 100 may be implemented by a computing device local to the print device, such as a local computer or a local server in communication with the print device. In some examples, the method 100 may be implemented by a computing device remotely located from the print device, such as a distributed processor that may be a part of a cloud computing system and used to implement a print service or a managed print service. In further examples, the method 100 may be implemented using a combination of the print device, the computing device local to the print device and/or the remote computing device.

Figure 2:
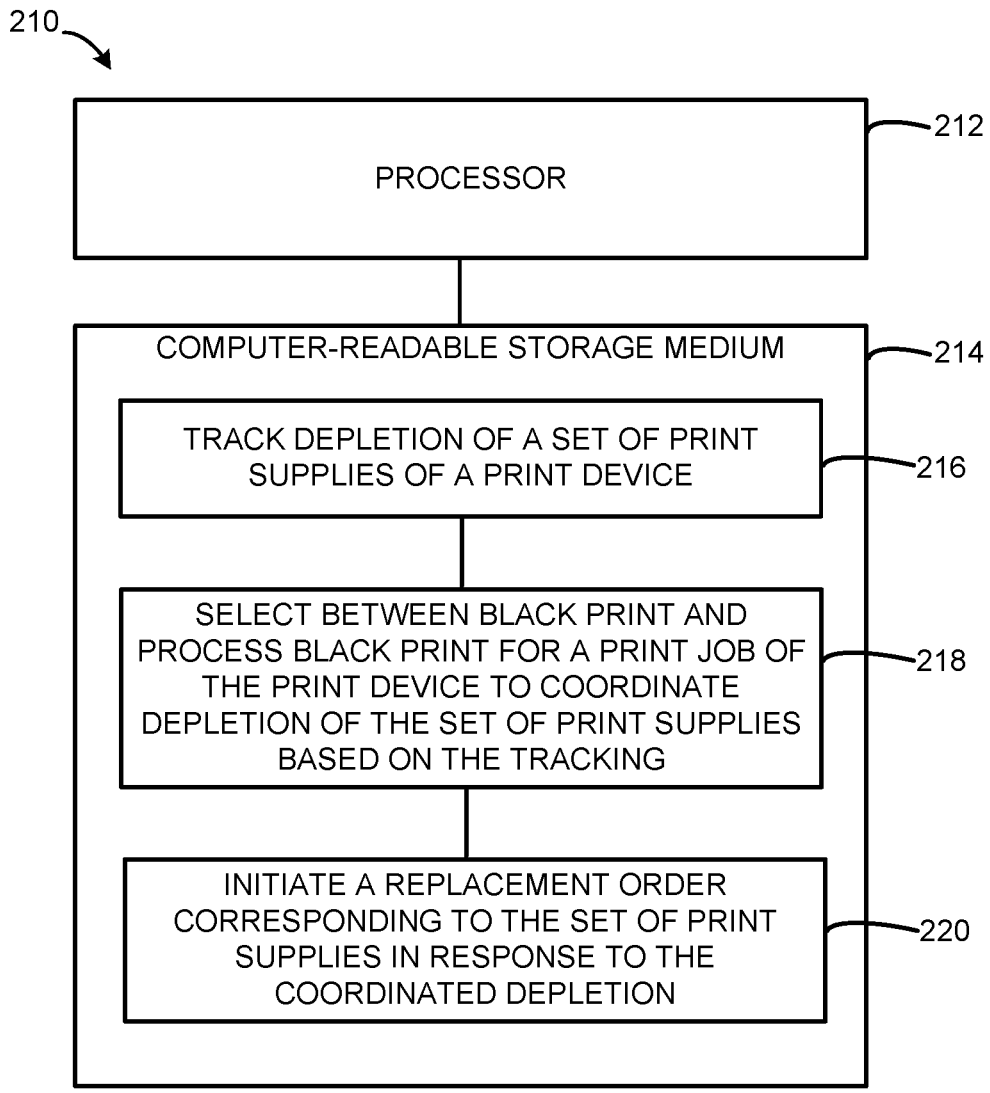
FIG. 2 illustrates an example device including non-transitory computer-readable storage medium, in accordance with examples of the present disclosure.

FIG. 2 illustrates an example device including non-transitory computer-readable storage medium, in accordance with examples of the present disclosure. The device 210 includes a processor 212 and memory. The memory may include a computer-readable storage medium 214 storing a set of instructions 216, 218, and 220.

The computer-readable storage medium 214 may include Read-Only Memory (ROM), Random-Access Memory (RAM), Electrically Erasable Programmable Read-Only Memory (EEPROM), flash memory, a solid state drive, Electrically Programmable Read Only Memory aka write once memory (EPROM), physical fuses and e-fuses, and/or discrete data register sets. In some examples, computer-readable storage medium 214 may be a non-transitory storage medium, where the term "non-transitory" does not encompass transitory propagating signals.

At 216, the processor 212 may track depletion of a set of print supplies of a print device. The depletion of the set of print supplies may be tracked based on a plurality of supply levels corresponding to the set of print supplies over the supply lifetimes. At 218, the processor 212 may select between black print and process black print for a print job of the print device to coordinate depletion of the set of print supplies based on the tracking. At 220, the processor 212 may initiate a replacement order corresponding to the set of print supplies in response to the coordinated depletion. The replacement order may be initiated, for example, in response to respective print supply of the set of print supplies having supply levels below a threshold level.

In various examples, the processor 212 may adaptively switch between the black print and the process black print for a plurality of print jobs of the print device to coordinate the depletion of the set of print supplies, where the plurality of print jobs includes the print job. For example, the processor 212 may track the depletion of the set of print supplies based on a plurality of supply levels that correspond to the set of print supplies and initiate simultaneous replacement of a plurality of print supplies of the set of print supplies.

As previously described, the selection may be based on a set of rules and/or a data model. In some examples, the processor 212 may select between the black print and process black print based on the data model and input data, such as the input data described in connection with method 100. As further illustrated by FIG. 4, the data model may be used to balance cost for the customer, cost for the service provider, and supply lifetime.

In various examples, the processor 212 and computer-readable storage medium 214 may form part of the print device, part of a remotely-located computing device, or part of a computing device that is local to the print device, such as a local server or computer and sometimes herein referred to as "a local computing device". In some examples, the device 210 forms part of a cloud computing system having a plurality of remotely-located and/or distributed computing devices. For example, although FIG. 2 illustrates a single processor 212 and a single computer-readable storage medium 214, examples are not so limited and may be directed to devices and/or systems with multiple processors and multiple computer-readable storage mediums. The instructions may be distributed and stored across the multiple computer-readable storage mediums and may be distributed and executed by the multiple processors.

In some examples, the processor 212 may aggregate data associated with usage patterns of print supplies for a plurality of print devices. For example, the processor 212 may aggregate the data, and provide analytics on the usage of print supplies. The data analytics may be used to track usage patterns of print supplies and predict depletion or consumption rates of print supplies of a set based on past usage patterns of the particular print device, a user, and/or a plurality of print devices. As an example, a particular organization may use a color faster than other organizations, such as an organization with a particular color logo. As another example, a particular industry may exhibit particular usage patterns of print supplies. The usage patterns of print supplies may be used to supplement current supply levels to select between black print and process black print. In some examples, the usage pattern may be specific to a user, a print device, and/or an organization.

Figure 3:
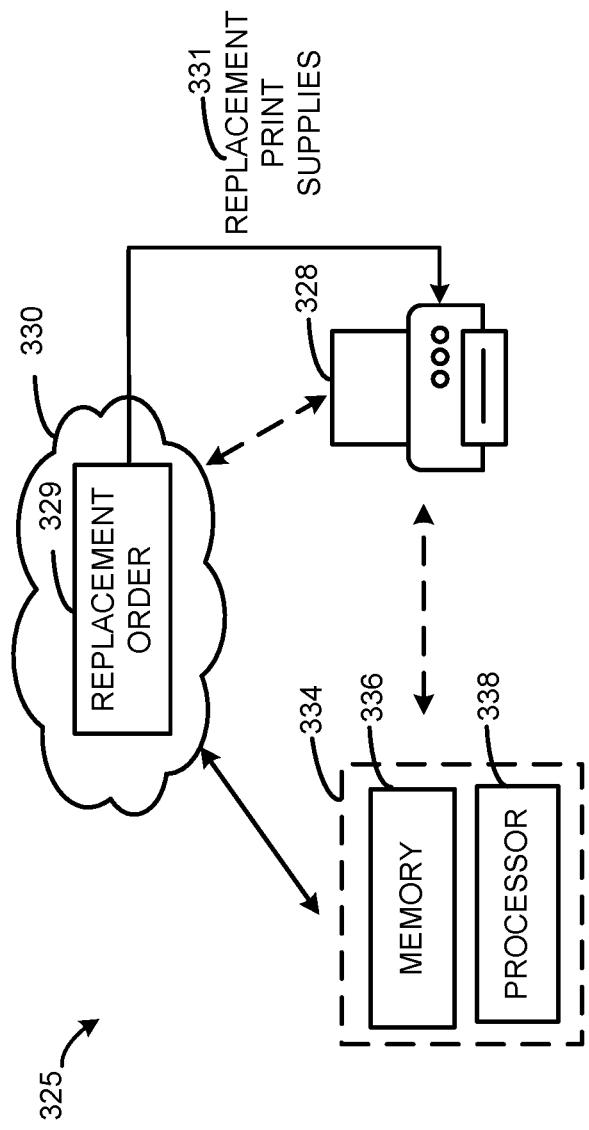
FIG. 3 illustrates an example system for selecting between black print and process black print, in accordance with examples of the present disclosure.

FIG. 3 illustrates an example system for adaptively switching between black print and process black print, in accordance with examples of the present disclosure.

The system 325 includes a memory 336 and a processor 338. In some examples, the memory 336 and processor 338 may form part of a computing device 334. The computing device 334 may be local to the print device 328 or may include the print device 328 itself. In some examples, the computing device 334 is remote from the print device 328. The computing device 334 and print device 328 may communicate between one another and with other devices using data communications over the network 330. In other examples, the memory 336 and processor 338 may form part of different computing devices.

The memory 336 may store a plurality of supply levels corresponding to a set of print supplies of a print device 328. The set of print supplies may be attached to the print device 328, such as being inserted into or installed. In some examples, the supply levels may be tracked over supply lifetimes of the print supplies. In some examples, such as with cloud computing, the memory 336 stores a plurality of supply levels corresponding to a plurality of sets of print supplies of a plurality of print devices. The stored data may be used to identify usage patterns of print supplies of the print device 328 or users of the print device 328, and/or usage patterns which are general across a plurality of print devices.

The processor 338 may track depletion of the set of print supplies based on the plurality of supply levels, and adaptively switch between black print and process black print for a plurality of print jobs of the print device to coordinate depletion of the set of print supplies based on the tracked depletion, as previously described. The processor 338 may initiate a replacement order 329 corresponding to a plurality of the set of print supplies, which may be referred to as the "replacement print supplies 331", based on the coordinated depletion of the set of print supplies.

In some examples, the processor 338 instructs the print device 328 to adaptively switch between execution of the black print and the process black print for the plurality of print jobs. The processor 338 may directly instruct the print device 328 or indirectly through a local computing device, such as the computing device 334. The system 325 may track use of the print service and adaptively switch between black print and process black print to balance print cost and supply lifetime, as previously described.

In some examples, the system 325 includes a plurality of distributed computing devices used to provide the print service, such as a print supply replacement service or a managed print service. The plurality of distributed computing devices may include servers and/or databases that form part of a cloud computing system. The memory 336 and processor 338 may form part of the plurality of distributed computing devices to provide the print service. In some examples, one of the plurality of distributed computing devices may include the memory 336 and the processor 338. In other examples, the memory 336 may form part of a first distributed computing device and the processor 338 may form part of a second distributed computing device of the plurality.

The example system 325 may communicatively connect the plurality of distributed computing devices to a plurality of external devices over the network 330. The plurality of external devices may include a plurality of print devices including the print device 328 and/or a plurality of end-user computing devices including the computing device 334. Example end-user computing devices include desktop computers, laptops, tablets, and smartphones. In some such examples, the processor 338 may instruct the print device 328 to adaptively switch between execution of the black print and the process black print for the plurality of print jobs.

However, examples are not so limited. In some examples, the memory 336 and processor 338 form part of the print device 328, and the processor 338 executes the plurality of print jobs selectively using black print and process black print, and communicates with a computing device (e.g., local or remote) to initiate the replacement order. In some examples, the memory 336 and processor 338 form part of the computing device 334 and the processor 338 is to instruct the print device 328 to adaptively switch between execution of black print and process black print based on a data model and input data, and initiate the replacement order via communication with a remote computing device. The input data may include the plurality of supply levels, shipping parameters, and print performance. In some examples, the computing device 334 may be in communication with the distributed computing devices and the data model may be obtained from the cloud computing system over the network 330.

Figure 4:
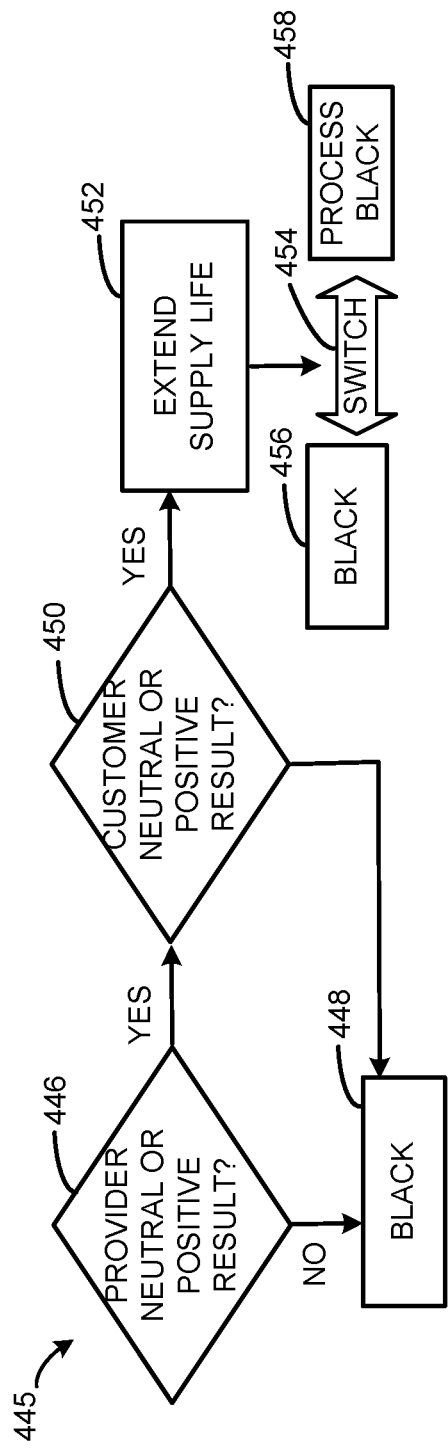
FIG. 4 illustrates an example method for adaptively switching between black print and process black print, in accordance with examples of the present disclosure.

FIG. 4 illustrates an example method for adaptively switching between black print and process black print, in accordance with examples of the present disclosure. The method 445 may form part of the method 100 of FIG. 1 and/or may be executed using the device 210 of FIG. 2 or the system 325 of FIG. 3.

At 446, in response to a print job request, a determination is made on whether a process black print provides a neutral or positive result for the service provider. Example neutral or positive results for the service provider include complying with terms of a service agreement, preventing or avoiding penalties to the service provider from the print job(s), increasing supply lifetime(s), increasing coordination of depletion of the set of print supplies, complying with replacement order terms, and decreasing or causing a net neutral service provider cost (e.g., cost per page, shipping costs and/or service costs), among others. In response to determining the process black print may not result in the neutral or positive result for the service provider, at 448, the print job is initiated for execution by the print device with a black print. In some examples, the neutral or positive result for the service provider and the customer, as described below, may include a net neutral or positive result which factors in a set of results and/or weighs the results of the set to provide a net total result.

In response to determining the process black print results in the neutral or positive result for the service provider, at 450, a determination is made on whether the process black print provides a neutral or positive result for the customer. Example neutral or positive results for the customer include improving print quality, increasing supply lifetime(s), increasing coordination of depletion of the set of print supplies, and decreasing or causing a net neutral customer cost (e.g., cost per page and labor costs), among others. Example negative results for the customer include increasing a cost per page and/or labor costs, and decreasing supply lifetime for a print supply, among others. In response to determining the process black print may not result in the neutral or positive result for the customer, at 448, the print job is initiated for execution by the print device with a black print.

In response to determining the process black print results in the neutral or positive result for the customer, at 452, the supply lifetime is extended. For example, as shown at 454, extending the supply lifetime may include adaptively switching between black print 456 and process black print 458.

In some examples, a cloud computing system may perform the determinations, at 446 and 448, and extends the supply lifetime, at 452, including the adaptive switching 454. In other examples, a local computing device or the print device may perform the determinations, at 446 and 448, and extends the supply lifetime, at 452, including the adaptive switching 454. In further examples, a combination may be used, such the cloud computing system performing the determinations, at 446 and 448, and extending the supply lifetime, at 452, by instructing the print device or local computing device to adaptively switch between the black print 456 and the process black print 458 at 454. The cloud computing system may use a data model to perform the determinations and extend the supply lifetime, and instructs the print device or local computing device to adaptively switch between process black print 458 and black print 456 using a set of rules associated with the data model. The cloud computing system may update the set of rules based on the data model. In other examples, the cloud computing system may train the data model and provide the trained data model to the print device or local computing device.

Figure 5A:
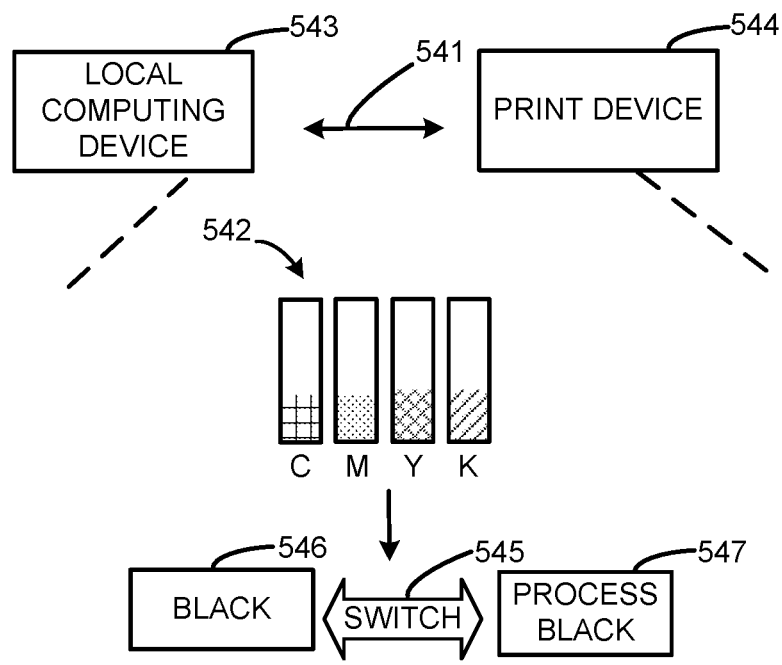
FIGS. 5A-5C illustrate example systems for selecting between black print and process black print, in accordance with examples of the present disclosure.
Figure 5B:
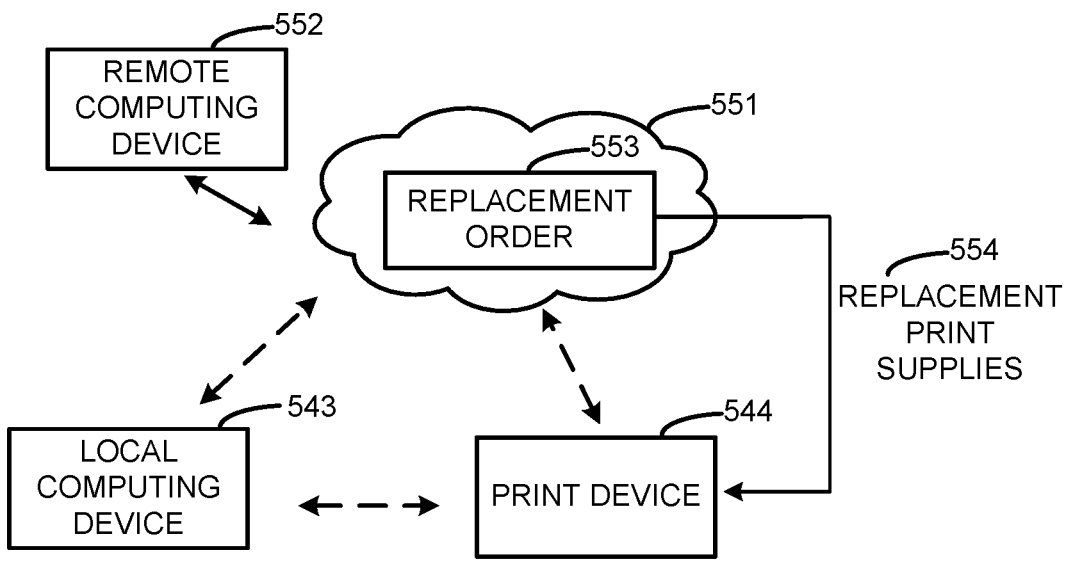
Figure 5C:
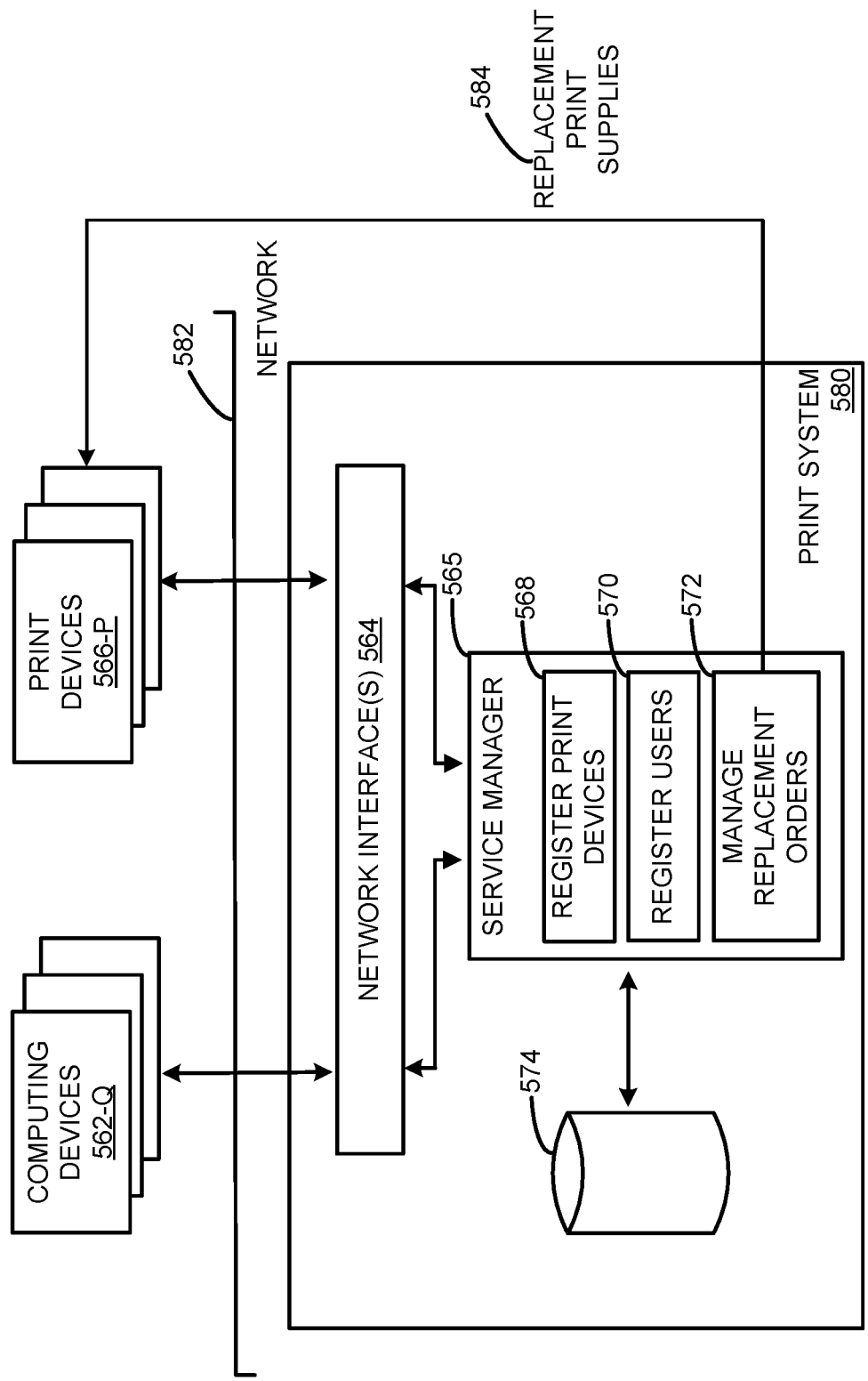

FIGS. 5A-5C illustrate example systems for selecting between black print and process black print, in accordance with examples of the present disclosure.

FIG. 5A illustrates an example system that includes a print device 544 and a local computing device 543 that instructs the print device 544 to execute a print job using a network communication 541. In some examples, the print device 544 may include the device 210 of FIG. 2 and/or may implement the method 100 illustrated by FIG. 1 to identify a plurality of supply levels 542 of a set of print supplies, e.g., CMYK, and adaptively switch 545 between black print 546 and process black print 547. In some examples, the local computing device 543 may include the device 210 of FIG. 2 and/or may implement the method 100 illustrated by FIG. 1 to adaptively switch 545 between black print 546 and process black print 547. The adaptive switching may coordinate depletion of the set of print supplies, such as reducing variances in supply levels between a plurality of print supplies of the set. In the particular example, each of the plurality of print supplies in the set has a similar supply level and may be replaced in a single replacement order. However, examples are not so limited, and the coordinated depletion may include two print supplies or three print supplies.

FIG. 5B illustrates an example system that includes a print device 544 574, a local computing device 543, and a remote computing device 552 which forms part of a cloud computing system 551 or other type of system.

In some examples, the local computing device 543 may include a local server in communication with and/or controlled by the cloud computing system 551. For example, the remote computing device 552 may provide instructions to the local computing device 543, which may select between black print and process black print. The instruction may include the data model or set of rules, such that the local computing device 543 may make the selection locally. The local computing device 543 may receive the request for the print job from a user, select between black print and process black print, and instruct the print device 544 to execute the print job based on the selection. In other examples, the remote computing device 552 or the local computing device 543 may provide instructions to the print device 544, such that the print device 544 may make the selection locally.

In some examples, the remote computing device 552 may drive the selection between black print and process black print. The local computing device may communicate data indicative of a request for a print job to the remote computing device 552 or to the print device 544 which communicates with the remote computing device 552. In response to the communication, the remote computing device 552 selects between black print and process black print, and instructs the print device 544 to execute the print job based on the selection, either directly or through the local computing device 543.

Some examples may include a combination of remote and local processing. For example, the remote computing device 552 may use a data model to determine a set of rules or to train the data model to provide to the local computing device 543 or the print device 544. The local computing device 543 or the print device 544 may locally select between process black print and black print using the set of rules or the trained data model. The remote computing device 552 may send updated rules based on revisions to the data model or provide a revised trained data model, among other revisions.

In various examples, the remote computing device 552, the local computing device 543, or the print device 544 may initiate a replacement order 553 for the set of print supplies. The replacement order 553 may be initiated in response to threshold supply levels, predicted supply lifetimes, and/or based on shipping or services times, among other data. In some examples, the initiation of the replacement order 553 may cause shipment of replacement print supplies 554 to the customer.

FIG. 5C illustrates an example print system for print supply management, in accordance with examples of the present disclosure. The print system 580 may provide a registration process for print devices, and may manage replacement orders for print supplies. The print system 580 may be implemented by a remote service provider. The print system 580 may be used to provide a portal to receive data as part of a registration process from print devices 566-P and/or computing devices 562-Q and includes a service manager 565 to manage services for registered users.

The components of the print system 580 may be implemented using computer-readable instructions and/or on a computing device, such as a server, a laptop, a computing device, or on a plurality of distributed computing devices including distributed processor and memory resources that may communicate with one another and with other devices over the network 582. The computing device(s) may operate to execute computer-readable instructions, such as described above, to perform the processes described herein and related to the various components of the print system 580. The print system 580 may be cloud-based, for example, and/or may be implemented through other computer systems in alternative architectures, such as a peer-to-peer network.

The print system 580 may communicate with computing devices 562-Q and print devices 566-P over the network 582 using a network interface 564. In various examples, the print system 580 includes a plurality of network interfaces for communicating over a plurality of networks, such as wireless and wired networks. In a specific example, the print system 580 communicates with the computing devices 562-Q via the network interface 564 and a portal or an application programming interface (API).

The print system 580 includes a service manager 565 that manages a plurality of services for users registered with the print system 580. The service manager 580 may provide a registration process in which a user registers the user or an associated organization with a print service, at 570, and may optionally register print devices 566-P to be accessible as user defined, at 568. The service manager 565 stores the various data for registration in memory, such as in a database 574. Although one database 574 is illustrated, example print systems 580 include a plurality of databases stored on memory resources and which are accessible by a plurality of distributed processors which may implement the service manager 565.

In some examples, the registration process may include execution of a service agreement with the service provider. The service agreement may set out terms and parameters for providing the particular print service for the account. For example, the service agreement may specify a cost to print a page using particular type of print. The cost may be calculated based on parameters of the print job. Parameters of the print job may include a type of print supply, including type of ink or toner and media, and a print mode.

The service manager 565 monitors use of the printing services across the print devices 566-P. For example, the service manager 565 may monitor print supplies of the plurality of print devices 566-P based on the tracked supply levels and may manage replacement orders 572. Managing the replacement orders may include adaptively switching between black print and process black print for the print devices 566-P. The switching may be controlled remotely by the service manager 565 or locally by the print devices 566-P and/or the computing devices 562-Q using a set of rules and/or a trained data model, as previously described. By adaptively switching between the black print and process black print, supply lifetimes may be extended and the set of print supplies for respective print devices may be depleted in a coordinated manner to allow for reduced costs to the service provider for replacing the print supplies across the print system 580 with increased time between supply change events and reduced customer interaction for replacing the print supply of the print devices 566-P. The service manager 565 may manage the replacement orders to balance cost to the service provider and to the customer. In some examples, the replacement print supplies 584 are ordered by the service manager 565, such as by initiating an order for a plurality of the set of print supplies at a warehouse or other supply source. The replacement print supplies 584 may be shipped from the supply source to a location associated with the print device for installation. In other examples, the replacement print supplies 584 are ordered by the service manager 565 scheduling an appointment with an employee of the service provider. The employee may travel to the location associated with the print device and install the replacement print supplies 584.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
    applying a rule corresponding to a threshold level to a plurality of supply levels corresponding to a set of print supplies of a print device;
    identifying a current level of the plurality of supply levels corresponding to the set of print supplies of a print device;
    coordinating depletion of the set of print supplies by selecting between black print and process black print for a print job of the print device based on the rule corresponding to the threshold level and the current level of the plurality of supply levels.

2. The method of claim 1, wherein selecting between the black print and process black print further includes balancing print performance and supply lifetime of the set of print supplies, and the method further includes initiating execution of the print job by the print device based on the selection.

3. The method of claim 1, further including applying a set of rules to the plurality of supply levels to automatically select between the black print and process black print.

4. The method of claim 1, further including applying a data model to input data to automatically select between the black print and process black print, the input data including the plurality of supply levels.

5. The method of claim 4, wherein the data model includes a machine learning model (MLM) and the method further includes:
    predicting the depletion of the set of print supplies based on the input data and selecting between the black print and process black print based on the prediction.

6. The method of claim 1, wherein coordinating depletion of the set of print supplies includes adaptively switching between the black print and process black print for a plurality of print jobs including the print job, and the method further includes:
    initiating a replacement order corresponding to a plurality of print supplies of the set of print supplies.

7. The method of claim 1, further including:
    identifying a categorization of the print job; and
    selecting between the black print and process black print for the print job based on the plurality of supply levels and the categorization of the print job.

8. A non-transitory computer-readable storage medium comprising instructions that when executed cause a processor to:
    apply a rule corresponding to a supply level of a set of print supplies to the set of print supplies of a print device;
    identify a current level of the set of print supplies of the print device;
    track depletion of the set of print supplies of a print device;
    select between black print and process black print for a print job of the print device to coordinate depletion of the set of print supplies based on the tracking, the applied rule corresponding to the supply level of the set of print supplies, and the current level of the set of print supplies; and
    initiate a replacement order corresponding to the set of print supplies in response to the coordinated depletion.

9. The non-transitory computer-readable storage medium of claim 8, further including instructions that when executed, cause the processor to:
    adaptively switch between the black print and process black print for a plurality of print jobs of the print device to coordinate the depletion of the set of print supplies, wherein the plurality of print jobs includes the print job.

10. The non-transitory computer-readable storage medium of claim 8, further including instructions that when executed, cause the processor to:

select between the black print and process black print based on a data model and input data, the input data being selected from:
   a plurality of supply levels corresponding to the set of print supplies, patterns of usage of the set of print supplies, shipping parameters, predicted supply lifetime for the set of print supplies, print performance, service parameters, content of the print job, service agreement, and a combination thereof.

11. The non-transitory computer-readable storage medium of claim 8, further including instructions that when executed, cause the processor to:
   track the depletion of the set of print supplies based on a plurality of supply levels that correspond to the set of print supplies; and
   initiate simultaneous replacement of a plurality of print supplies of the set of print supplies via the replacement order.

12. A system comprising:
   a memory to store a plurality of supply levels corresponding to a set of print supplies of a print device;
   a processor to:
      apply a rule corresponding to a print quality of the set of print supplies to the set of print supplies of a print device;
      identify a current level of the set of print supplies of the print device;
      track depletion of the set of print supplies based on the plurality of supply levels;
      adaptively switch between black print and process black print for a plurality of print jobs of the print device to coordinate depletion of the set of print supplies based on the tracked depletion, the applied rule corresponding to the print quality of the set of print supplies, and the current level of the set of print supplies; and
      initiate a replacement order corresponding to a plurality of print supplies of the set of print supplies based on the coordinated depletion of the set of print supplies.

13. The system of claim 12, wherein the memory and processor form part of a computing device and the processor is to:
   instruct the print device to adaptively switch between execution of the black print and process black print based on a data model and input data, the input data including the plurality of supply levels, shipping parameters, and print performance; and
   initiate the replacement order via communication with a remote computing device.

14. The system of claim 12, wherein the memory and processor form part of a plurality of distributed computing devices to provide a print service, and the processor is further to:
   instruct the print device to adaptively switch between execution of the black print and process black print for the plurality of print jobs.

15. The system of claim 12, wherein the memory and processor form part of the print device, and the processor is to:
   execute the plurality of print jobs selectively using the black print and process black print; and
   communicate with a computing device to initiate the replacement order.

* * * * *